(12) United States Patent
Bansal et al.

(10) Patent No.: US 10,666,508 B2
(45) Date of Patent: May 26, 2020

(54) UNIFIED SOFTWARE DEFINED NETWORKING CONFIGURATION MANAGEMENT OVER MULTIPLE HOSTING ENVIRONMENTS

(71) Applicant: NICIRA, INC., Palo Alto, CA (US)

(72) Inventors: Kaushal Bansal, Pleasanton, CA (US); Sorabh Kalra, Pune (IN); Anil Kumar, Bundi (IN); Shashikant Anna Shinde, Pune (IN); Sachin Mohan Vaidya, Pune (IN)

(73) Assignee: Nicira, Inc., Palo Alto, CA (US)

( * ) Notice: Subject to any disclaimer, the term of this patent is extended or adjusted under 35 U.S.C. 154(b) by 165 days.

(21) Appl. No.: 15/810,158

(22) Filed: Nov. 13, 2017

(65) Prior Publication Data
US 2018/0359145 A1    Dec. 13, 2018

(30) Foreign Application Priority Data
Jun. 9, 2017    (IN) .............................. 201741020300

(51) Int. Cl.
| | |
|---|---|
| *H04L 12/24* | (2006.01) |
| *G06F 9/455* | (2018.01) |
| *H04L 29/06* | (2006.01) |
| *H04L 29/08* | (2006.01) |
| *G06F 8/71* | (2018.01) |
| *G06F 8/65* | (2018.01) |

(52) U.S. Cl.
CPC ............ *H04L 41/0803* (2013.01); *G06F 8/65* (2013.01); *G06F 8/71* (2013.01); *G06F 9/45558* (2013.01); *H04L 41/082* (2013.01); *H04L 41/0893* (2013.01); *H04L 41/28* (2013.01); *H04L 63/20* (2013.01); *H04L 67/10* (2013.01); *H04L 67/34* (2013.01); *G06F 2009/45595* (2013.01); *H04L 41/0873* (2013.01); *H04L 67/1095* (2013.01)

(58) Field of Classification Search
CPC ............... H04L 41/082; H04L 41/0893; H04L 41/0853; H04L 41/0873; H04L 41/046; H04L 41/0803; H04L 41/0816
See application file for complete search history.

(56) References Cited

U.S. PATENT DOCUMENTS

| | | | | |
|---|---|---|---|---|
| 2015/0229521 A1* | 8/2015 | Mayer | ................. | H04L 67/1097 709/222 |
| 2016/0112269 A1* | 4/2016 | Singh | .................. | H04L 41/0853 709/224 |

(Continued)

*Primary Examiner* — David R Lazaro

(57) ABSTRACT

Described herein are systems, methods, and software to enhance the management of software defined networking configurations over multiple hosting environments. In one implementations, a sync service receives a software defined networking configuration from a software defined networking manager of a first hosting site. Once received, the sync service determines differencing data between the software defined networking configuration and a second software defined networking configuration received previously by the sync service from the first hosting site. The sync service further identifies a configuration update for a second software defined networking manager of a second hosting site based on the differencing data, and transfers the configuration update to the second software defined networking manager.

20 Claims, 7 Drawing Sheets

(56) References Cited

U.S. PATENT DOCUMENTS

| | | | |
|---|---|---|---|
| 2016/0173329 A1* | 6/2016 | Latham | H04L 41/0806 |
| | | | 370/254 |
| 2017/0048200 A1* | 2/2017 | Chastain | H04L 63/0272 |
| 2017/0195171 A1* | 7/2017 | Wohlert | H04L 41/0803 |
| 2017/0317979 A1* | 11/2017 | Bansal | H04L 63/0236 |
| 2018/0007004 A1* | 1/2018 | Basler | H04L 63/0236 |
| 2018/0084012 A1* | 3/2018 | Joseph | H04L 63/1416 |
| 2018/0124118 A1* | 5/2018 | Wu | H04L 43/026 |
| 2018/0219726 A1* | 8/2018 | Wang | H04L 41/082 |
| 2018/0227185 A1* | 8/2018 | Turner | H04L 63/0263 |
| 2018/0329730 A1* | 11/2018 | Bansal | G06F 9/45533 |
| 2018/0359145 A1* | 12/2018 | Bansal | G06F 8/65 |
| 2019/0007267 A1* | 1/2019 | Kuusisaari | H04L 41/0816 |
| 2019/0102351 A1* | 4/2019 | Wu | G06F 16/9574 |

* cited by examiner

| PRIMARY SITE 510 | SECONDARY SITE 512 |
|---|---|
| VM ID 520 | VM ID 530 |
| VM ID 521 | VM ID 531 |
| VM ID 522 | VM ID 532 |
| VM ID 523 | VM ID 533 |

DATA STRUCTURE 500

FIGURE 5

UNIFIED SOFTWARE DEFINED NETWORKING CONFIGURATION MANAGEMENT OVER MULTIPLE HOSTING ENVIRONMENTS

RELATED APPLICATIONS

Benefit is claimed under 35 U.S.C. 119(a)-(d) to Foreign Application Serial No. 201741020300 filed in India entitled "UNIFIED SOFTWARE DEFINED NETWORKING CONFIGURATION MANAGEMENT OVER MULTIPLE HOSTING ENVIRONMENTS", on Jun. 9, 2017, by NICIRA, INC., which is herein incorporated in its entirety by reference for all purposes.

TECHNICAL BACKGROUND

In computing environments, software defined networks may be used that comprise software modules capable of providing a communication platform for one or more virtual nodes in the computing environment. The software defined networks, which may include logical switches, routers, distributed firewalls, and the like, may be used to intelligently direct communication on the network by inspecting packets before passing them to other computing nodes. For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

To manage the software defined networks, a controller or manager may provide a control plane separate from the data plane of the networks. These controllers are used to define forwarding behavior by managed forwarding elements, such as virtual switches, that direct packets for logical overlay networks, also referred to as a software defined networks. In some implementations, this controller and manager may define which nodes are associated with which networks, which security mechanisms are placed on communicating packets, or some other control mechanism (e.g., load balancing, access control lists, etc.) with respect to the software defined networks.

In some implementations, organizations may employ multiple computing sites or environments to provide the desired operations of the organization. For example, a primary site with a first set of virtual machines may provide the primary computing operations for the organization, while a secondary site with a backup set of virtual machines (or other logical compute instances (LCIs) or workloads) may provide a backup or failover site for the computing operations. Thus, if for any reason the first site were to fail, the secondary site may maintain the required operations for the organization. However, although it is possible to duplicate LCIs across sites, maintaining software defined networking operations between the sites can be difficult and cumbersome, as object identifiers (e.g. logical network identifiers) may be different for each of the sites.

SUMMARY

The technology described herein enhances the management of software defined networking configurations over multiple hosting environments. In one implementation, a method of operating a sync service to manage software defined networking configurations over multiple hosting sites includes receiving a software defined networking configuration from a software defined networking manager of a first hosting site. The method further provides determining differencing data between the software defined networking configuration and a second software defined networking configuration received previously by the sync service from the first hosting site. The method also includes computing a configuration update for a second software defined networking manager of a second hosting site based on the differencing data, and transferring the configuration update to the second software defined networking manager.

BRIEF DESCRIPTION OF THE DRAWINGS

FIG. 5 illustrates a data structure to manage object identifiers for multiple hosting sites according to an implementation.

DETAILED DESCRIPTION

Figure 1:
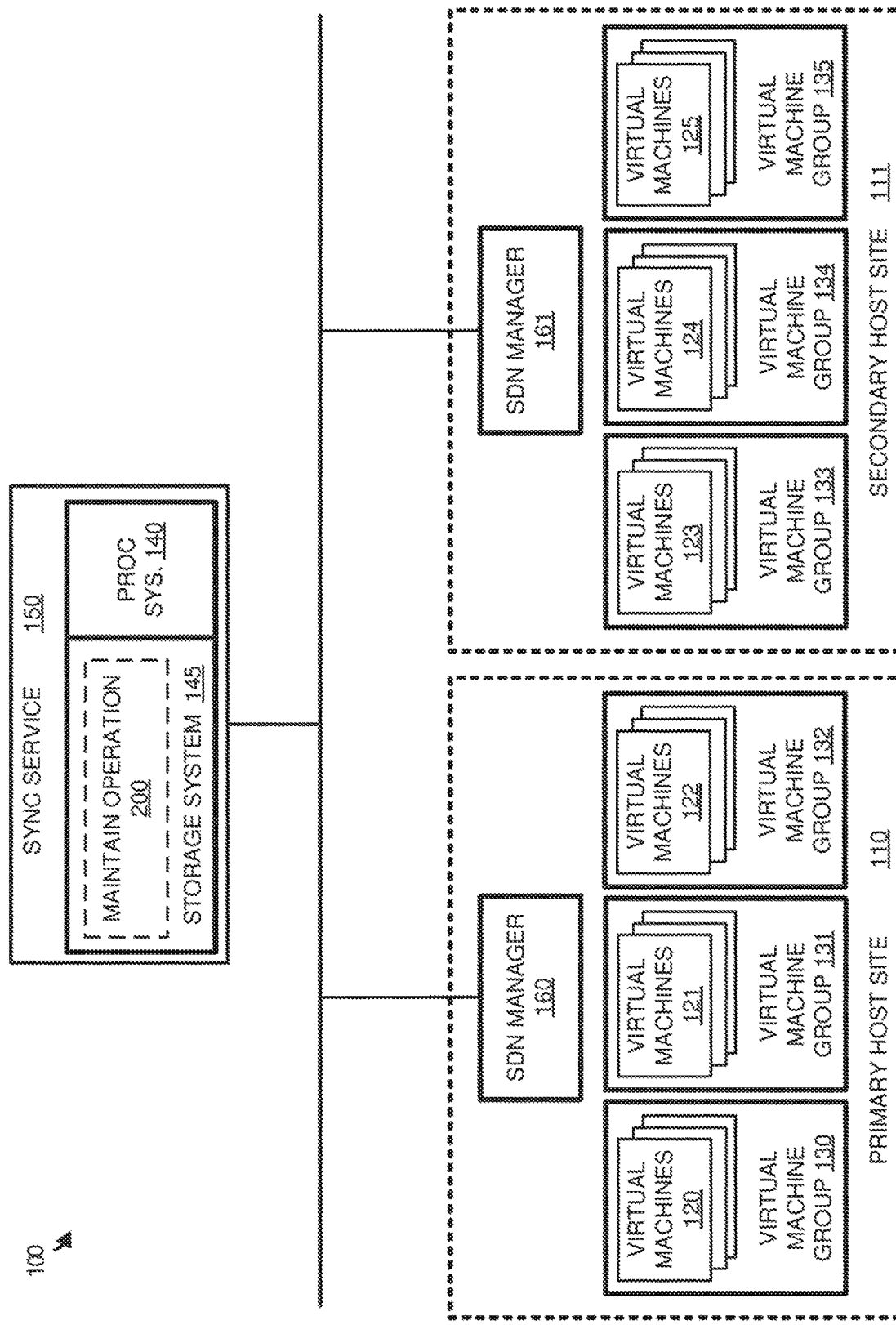
FIG. 1 illustrates a computing environment to manage software defined networking configurations over multiple sites according to an implementation.

FIG. 1 illustrates a computing environment 100 to manage software defined networking configurations over multiple sites according to an implementation. Computing environment 100 includes primary host site 110, secondary host site 111, and sync service 150. Primary host site 110 further includes virtual machine groups 130-132 and software defined networking (SDN) manager 160. Secondary host site 111 further includes virtual machine groups 133-135 and SDN manager 161. Sync service 150 includes processing system 140 that is operatively coupled to storage system 145 that stores maintain module 200. Virtual machines groups 133-135 are representative of back up virtual machine groups for corresponding virtual machine groups 130-132.

In operation, primary host site 110 and secondary host site 111 provide one or more host computing systems (not shown) capable of providing a platform for virtual machines 120-125. These host computing systems may each include storage systems, communication interfaces, and processing systems capable of executing a hypervisor as a platform for one or more virtual machines. In particular, the hypervisors may abstract the physical components of the host computing systems and provide virtual components to each of the virtual machines, wherein the virtual components may include virtual processing systems, virtual network interfaces, storage resources, and other similar computing elements. Virtual machines 120, 121, and 122 may be located on any arbitrary host machine primary host site 110 and a single host machine may host individual or multiple VMs from different virtual machine groups 130-132. In addition, it should be noted that, while the examples presented here primarily relate to virtual machines, that is but one type of logical computing instance (LCI), endpoint, or workload. The technology presented herein for managing software defined network configurations over multiple hosting environments is applicable to other types of LCIs, such as namespace containers like Docker® style containers.

In addition to providing virtual computing components to the virtual machines, a hypervisor, in conjunction with other hypervisors on other hosts, may also be used to provide software defined networking operations and management of data packets. To manage the software defined networking operations, SDN manager 160 is provided, which may reside on its own computing system (e.g., a physical server or a virtual machine), or may be distributed over one or more of the host computing systems. In particular, SDN manager 160 may maintain forwarding policies for each virtual machine of virtual machines 120-122. These forwarding policies may each include a source identifier, a destination identifier, a protocol or service, and an action to be taken when the source identifier, destination identifier, and protocol are identified. In some implementations, the source identifier and the destination identifier may represent tags that can be associated with one or more virtual machines. For example, virtual machines 120 are part of virtual machine group 130, which is representative of a tag that is shared and allocated to all virtual machines 120. Thus, if virtual machines 120 were representative of front-end virtual machines, each of the virtual machines may be provided with similar forwarding policies without deriving a separate forwarding policy for each virtual machine. Once the forwarding policies are defined, often by an administrator of primary host site 110, the data plane for virtual machines 120-122 may be configured based on the policies. This maintenance may permit hypervisors of primary host site 110 to identify attributes of communications, such as IP addresses, MAC addresses, and the like and forward the communications based on the defined policies.

As an illustrative example, a forwarding policy may permit virtual machines 120 classified in virtual machine group 130 to communicate with virtual machines 121 in virtual machine group 131 using only a database protocol. Consequently, when a hypervisor identifies a communication from a virtual machine of virtual machines 120 and identifies a destination virtual machine of virtual machines 121 using the database protocol, the hypervisor may forward the communication to the destination virtual machine. In identifying the source and destination virtual machines, the hypervisor may identify the source or destination IP addresses, the source or destination MAC addresses, or some other similar addressing information.

In addition to the operations provided locally at primary host site 110, secondary host site 111 is also provided that is used to provide a backup of the operations provided by the virtual machines in primary host site 110. Accordingly, when virtual machines are deployed in primary host site 110, secondary virtual machines are also deployed within secondary host site 111, which can be used to provide backup operations should the first host site encounter a failure. This permits virtual machines groups 130-132 to have a backup version of the virtual machines at corresponding virtual machine groups 133-135.

To ensure that the proper software defined networking configuration is implemented at secondary host site 111, sync service 150 is provided. Sync service 150 may reside in a third location, e.g., at a public cloud provider or other service provider or datacenter that is remote from primary host site 110, including at the secondary host site 111. Sync service 150 includes storage system 145 which is operatively coupled to processing system 140 using a bus or some other communication link. Processing system 140 comprises microprocessor and other circuitry that retrieves and executes software from corresponding storage system 145. Storage system 145 may include volatile and nonvolatile, removable and non-removable media implemented in any method or technology for storage of information, such as computer readable instructions, data structures, program modules, or other data. Storage system 145 may be implemented as a single storage device, but may also be implemented across multiple storage devices or sub-systems. Storage system 145 may comprise additional elements, such as a controller to read operating software. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal. When executed by processing system 140, maintain operation 200 directs processing system 140 to operate sync service 150 as further described in FIG. 2.

Figure 2:
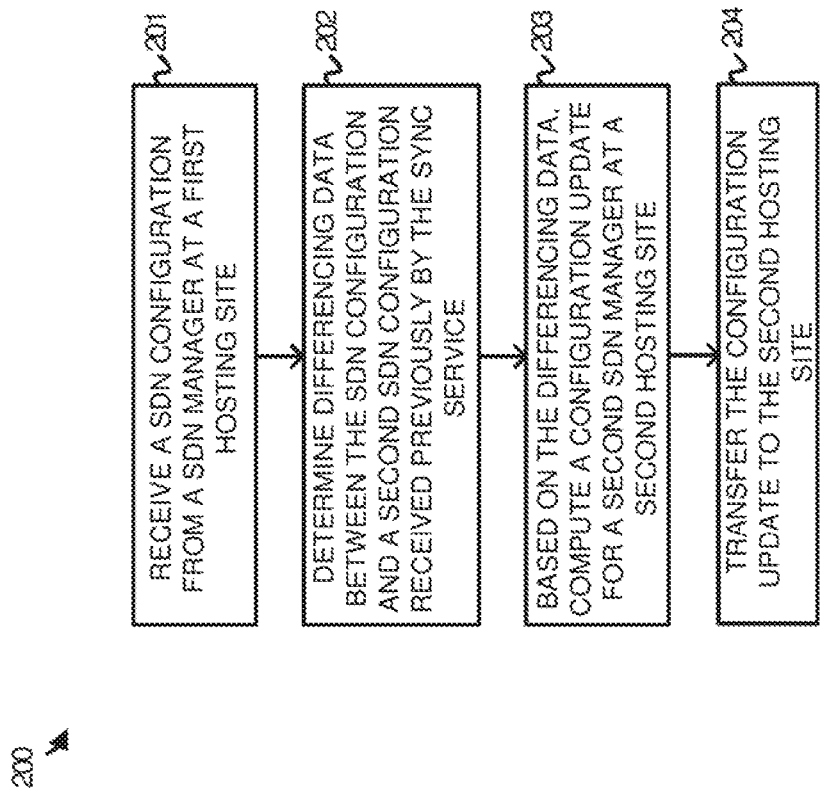
FIG. 2 illustrates a flow diagram of a maintain operation to manage software defined networking configurations over multiple sites according to an implementation.

FIG. 2 illustrates a flow diagram of a maintain operation 200 to manage software defined networking configurations over multiple sites according to an implementation. The processes in the flow diagram are referenced parenthetically in the paragraphs that follow with reference to systems and elements of computing environment 100 of FIG. 1.

In processing maintain operation 200, sync service 150 receives (201) a SDN configuration from SDN manager 160 of primary host site 110, wherein the SDN configuration includes information about forwarding policies implemented in primary host site 110, security group information for primary host site 110, and any other software defined network information for virtual machines operating in primary host site 110. The security group information may be used to define which security tags are associated with which virtual machines. For example, virtual machine group 130 may represent a security group that is associated with a first security tag, while virtual machine group 131 may represent a security group that is associated with a second security tag. The security tags may be used to define the security policies that correspond to each of the virtual machines.

Once the software defined networking configuration is provided to sync service 150, maintain operation 200 further directs processing system 140 to determine (202) differencing data between the received SDN configuration and a previously received SDN configuration for the primary host site. In some implementations, sync service 150 may receive, at intervals, software defined networking configurations from SDN manager 160. These intervals may be periodic, based on a request from sync service 150, or at any other interval, e.g., whenever changes are made to SDN configurations at primary host site 110. Once a configuration is received, sync service 150 may cache the configuration for comparison with a subsequently received configuration to determine differencing data between the configurations. This differencing data may include the addition or subtraction of security policies, the addition or subtraction of security groups, the addition or subtraction of virtual machines, or some combination thereof. For example, if a virtual machine were added to virtual machine group 132, sync service 150 may identify the addition of the virtual machine by comparing a cached configuration to a newest configuration provided by SDN manager 160.

After determining the differencing data between the software defined networking configurations, maintain operation 200 further directs processing system 140 to, based on the differencing data, compute (203) a configuration update for a second SDN manager 161 of secondary host site 111, and transfer (204) the configuration update to second hosting site. To compute the configuration update, sync service 150 may be required to translate or map the differences identified in primary host site 110 to an update that can be interpreted by SDN manager 161 of secondary host site 111.

In some implementations, the virtual machines (or other LCIs) of primary host site 110 may include unique identifiers that are different than the corresponding backup virtual machines in secondary host site 111. Consequently, if a new virtual machine were to be added with a first unique identifier in primary host site 110, it may be required that sync service 150 determine the corresponding unique identifier for the backup virtual machine in secondary host site 111. To determine the identifier for the corresponding virtual machine, sync service 150 may be configured to receive mapping information from SDN manager 160 and/or SDN manager 161. In at least one implementation, when a virtual machine is implemented in primary host site 110 an identifier for the virtual machine may be provided by SDN manager 160 to SDN manager 161 of secondary host site 111. Once a corresponding virtual machine is added to secondary host site 111, SDN manager 161 may provide an identifier for the virtual machine in primary host site 110 along with the corresponding identifier for the virtual machine in secondary host site 111 to sync service 150. This information may then be used by sync service 150 to implement a mapping between virtual machines in primary host site 110 and virtual machines in second host site 111.

Once the unique identifier is determined in secondary host site 111, a configuration update may be transferred that indicates security groups that the virtual machine in secondary host site 111 should belong. Although this is one example of mapping an identifier from the first site to the second site, it should be understood that the different sites may also use different tags for the virtual machines to associate the virtual machines with different security groups. For example, a security tag for virtual machine group 130 may be different than the tag in corresponding backup virtual machine group 133.

In some implementations, to provide the mappings and compute the configuration update that is required for secondary host site 111, sync service 150 may communicate with SDN manager 161 to determine state information for secondary host site 111. This state information may include identifiers for virtual machines executing in secondary host site 111, any security group information for secondary host site 111, or any other similar information. Based on the identified information, sync service 150 may determine a mapping between objects (virtual machines, groups, and the like) in primary host site 110 and objects in secondary host site 111.

As an illustrative example of identifying a configuration update for secondary host site 111, if a virtual machine were added that belonged to virtual machine group 130, sync service 150 may identify the addition of the virtual machine and determine an identifier for the corresponding virtual machine in secondary host site 111. Once the virtual machine is identified, an update may be provided that joins the virtual machine to virtual machine group 133, which represents the backup virtual machines of virtual machines 120 of virtual machine group 130.

Although this is one example of a configuration modification to primary host site 110, it should be understood that other configuration modifications to primary host site 110 may be implemented. These modifications may include adding or removing a security group to primary host site 110, adding or removing policies for the virtual machine of primary host site 110, removing virtual machines from primary host site 110, or some other similar modification, including combinations thereof. Moreover, while demonstrated in the present example as providing configuration updates to a single secondary host site, it should be understood that updates may be carried to any number of other sites. Additionally, while the example provided herein includes using secondary host site 11 as a backup for primary host site 110, it should be understood that secondary host site 111 may also be used to provide supplemental computing resources for primary host site 110. In particular, if virtual machines are deployed at primary host site 110 using one or more security policies, and computing resources are saturated at primary host site 110, new virtual machines may be required to be deployed in secondary host site 111. As a result, sync service 150 may be required to identify the policies that are deployed within primary host site 110, and distribute the policies to secondary host site 111 to ensure that proper forwarding operations are implemented.

Returning to the elements of computing environment 100 of FIG. 1, although not illustrated, it should be understood that sync interface 150 may further include a communication interface to communicate with SDN managers 160-161. This communication interface, which may be communicatively coupled to processing system 140 and/or storage system 145, may be configured to communicate over metallic, wireless, or optical links, and may be configured to use Time Division Multiplex (TDM), Internet Protocol (IP), Ethernet, optical networking, wireless protocols, communication signaling, or some other communication format—including combinations thereof.

SDN managers 160-161 and the host computing systems of host sites 110-111 may operate on one or more computing systems. These computing systems may comprise serving computers, desktop computers, or some other computing system, including combinations thereof. Each of the computing systems may include a storage system, a processing system, a communication interface, and in some examples a user interface.

Figure 3A:
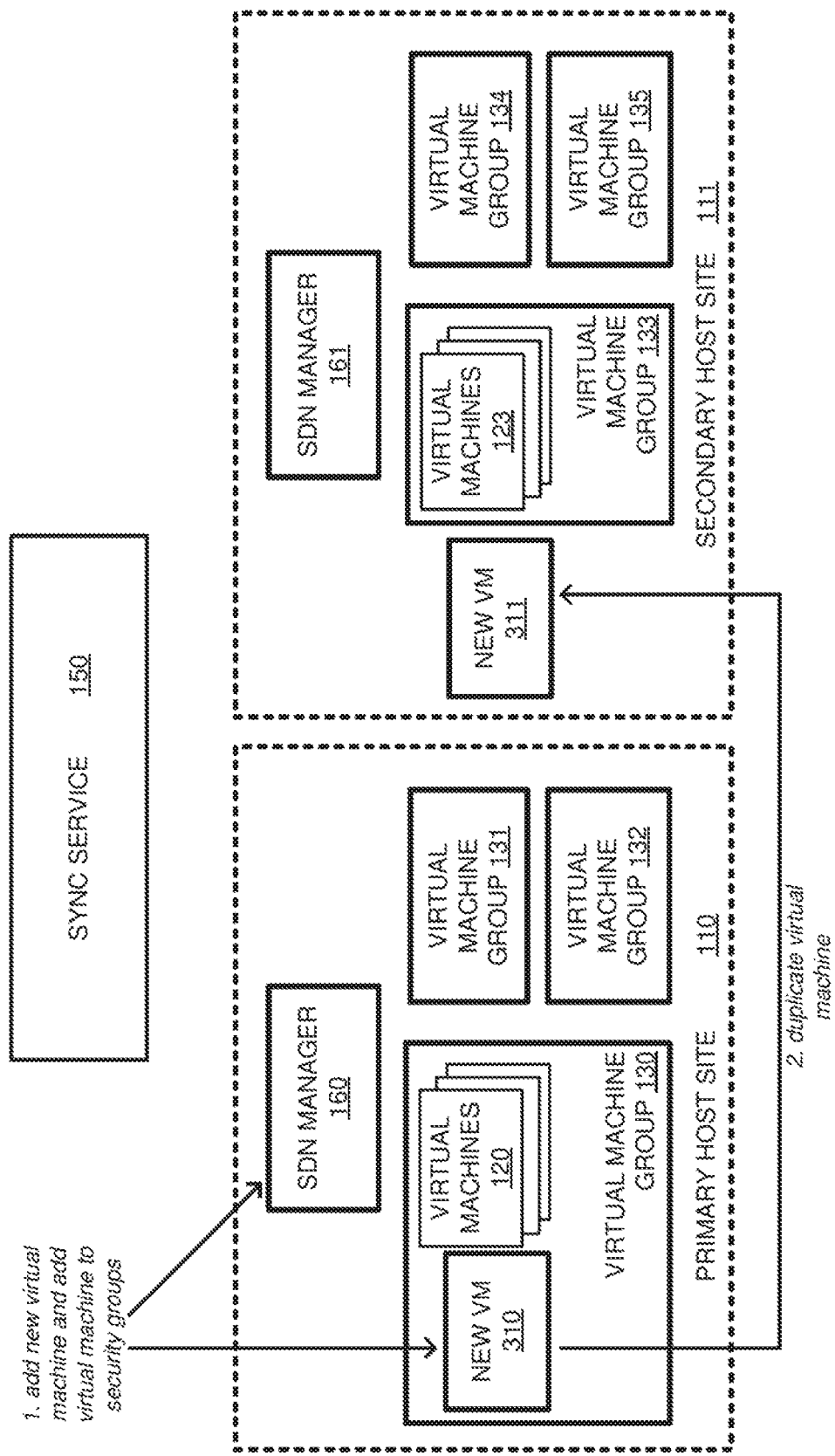
FIG. 3A illustrates an operational scenario of updating a software defined networking configuration according to an implementation.
Figure 3B:
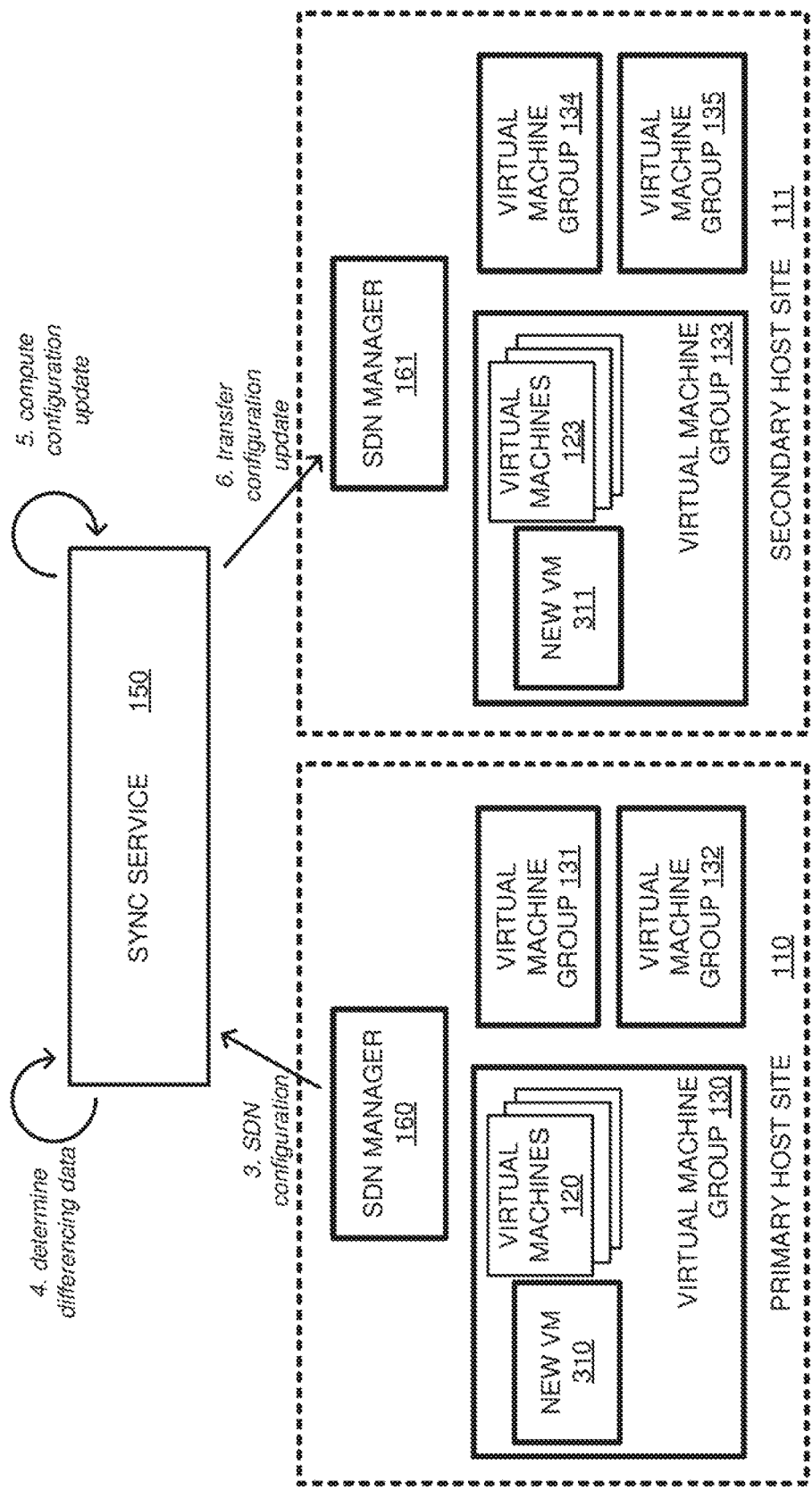
FIG. 3B illustrates an operational scenario of updating a software defined networking configuration according to an implementation.

FIGS. 3A and 3B illustrate an operational scenario of updating a software defined networking configuration according to an implementation. FIGS. 3A and 3B include systems and elements of computing environment 100 of FIG. 1. In particular, FIGS. 3A and 3B include sync service 150 and host sites 110-111. FIGS. 3A-3B further includes new virtual machines (VMs) 310-311, which are representative of virtual machines that have been added within a computing environment.

Referring first to FIG. 3A, in operation, an organization may deploy multiple hosting sites to provide backup mechanisms in case of failure of a primary hosting site. At each of the hosting sites, one or more host computing systems may execute hypervisors capable of providing a platform for virtual machines in virtual machines groups 130-135. To manage the network connectivity for the virtual machines SDN managers 160-161 are provided that can control the forwarding policies and groups to which each of the virtual machines belong. These policies are then implemented in the data plane (often by the hypervisors), wherein communication traits to and from the virtual machines are identified and forwarded based on the policies. For example, a forwarding policy may define that virtual machines in virtual machine group 130 may communicate with virtual machines in virtual machine group 131 using a particular protocol. Consequently, when a communication is identified from a virtual machine in virtual machine group 130 that is destined for a virtual machine in virtual machine group 131 using the particular protocol, the communication may be forwarded to the virtual machine.

Here, after a software defined network configuration is deployed, new virtual machine 310 is added, at step 1, to the computing environment and is further added to virtual machine group 130. In some implementations, in adding new virtual machine to virtual machine group 130 an administrator may specify or define the security groups to which the virtual machine should belong. As a result, SDN manager 160 may maintain a data plane configuration that adds new virtual machine 310 to virtual machine group 130 and ensures that policies are enforced for new virtual machine 310. Once the virtual machine is added at primary host site 110, a duplicate of new virtual machine 310 is made, at step 2, and deployed within secondary host site 111. This deploying of the virtual machine in the secondary site ensures that, in case of a failure in primary host site 110, a second virtual machine in secondary host site 111 is also prepared to accommodate the desired operations. The deploying of the backup virtual machine may be triggered by a hypervisor for the primary virtual machine, may be triggered by a hypervisor management service, or may be initiated by some other service, e.g., a disaster recovery service, of primary host site 110.

Turning to FIG. 3B, after a virtual machine has been deployed in primary host site 110, SDN manager 160, at step 3, transfers a current software defined networking configuration for the primary host site. This software defined networking configuration may include information about the current policies that are implemented in the host site, as well as information about the security groups or tags that are associated with each of the virtual machines. For example, the software defined networking configuration may indicate that new virtual machine 310 and virtual machines 120 make up virtual machine group 130. In some implementations, each of the virtual machines may be associated with a particular identifier for primary host site 110. As a result, when a new virtual machine is added or is associated with a new security group or tag, sync service 150 may be required to determine an identifier of the corresponding virtual machine in the secondary host site.

To determine the identifier for the corresponding virtual machine, sync service 150 may be configured to receive mapping information from SDN manager 160 and/or SDN manager 161. In at least one implementation, when a virtual machine is implemented in primary host site 110 an identifier for the virtual machine may be provided by SDN manager 160 to SDN manager 161 of secondary host site 111. Once a corresponding virtual machine is added to secondary host site 111, SDN manager 161 may provide an identifier for the virtual machine in primary host site 110 along with the corresponding identifier for the virtual machine in secondary host site 111 to sync service 150. This information may then be used by sync service 150 to implement a mapping between virtual machines in primary host site 110 and virtual machines in second host site 111.

Once the software defined networking configuration is provided from SDN manager 160, sync service 150 determines, at step 4, differencing data between the received configuration and a configuration that was previously received by the sync service. In some implementations, sync service 150 may be configured to receive configurations from SDN manager 160 at various intervals. These intervals may be periodic, may be based on changes identified within primary host site 110, may be based on requests from sync service 150, or may be based on any other interval. Once a configuration is received, the configuration may be cached in a storage system by sync service 150 to compare the configuration with a configuration that is received subsequently. Accordingly, the SDN configuration received from SDN manager 160 may be compared to a configuration previously cached by sync service 150 to determine differencing data between the two configurations. This differencing data may include added or removed virtual machines, added or removed policies, added or removed groups, or some other configuration modification, including combinations thereof.

In the present implementation, sync service 150 may determine that new virtual machine 310 has been added to primary host site 110, and that the virtual machine is associated with virtual machine group 130. Virtual machine group 130 may be representative of one or more virtual machines that share similar operations, such as front-end virtual machines or application virtual machines.

Although not illustrated in the present example, each of the virtual machines groups may further be divided into sub-groups using one or more additional tags that can be associated with a virtual machine. For example, virtual machine group 130 may represent a security group tag that indicates the virtual machines are front-end virtual machines. However, all front-end virtual machines may be further be divided into sub-groups, such that different organizations, or different segments of the same organization, may be provided with separate security groups. As an illustrative example, an organization may employ both a currently deployed front-end virtual machine configuration and a testing front-end virtual machine configuration, and desire to keep the communications separate between the two sub-groups.

After sync service 150 determines that new virtual machine 310 has been added to primary host site 110 and the groups or tags associated with the virtual machine, sync service 150, at step 5 identifies a configuration update for secondary host site 111 and SDN manager 161. In particular, although new virtual machine 311 may be a duplicate of new virtual machine 310, a different identifier may be used by SDN 161 for new virtual machine 311 than is used for new virtual machine 310. Consequently, sync service 150 may be used to map the identifier for virtual machine 310 to the identifier for virtual machine 311, and correlate the tags and groups for virtual machine 310 to be applied to virtual machine 311.

Once the configuration update is determined by sync service 150, the configuration update may be transferred, at step 6, to SDN manager 161 of secondary host site 111. Once SDN manager 161 receives the configuration update, it may implement the update, which adds new virtual machine 311 to virtual machine group 133. In some implementations, this update may include associating a tag for virtual machine group 133 with new virtual machine 311. As a result, based on the tag, any forwarding policies that correspond to virtual machine group 133 may be similarly applied to new virtual machine 311. For example, if in the primary host site virtual machine group 130 is configured to be able to communicate with virtual machine group 131, then all virtual machines of virtual machine group 133 should be able to communicate with the virtual machines of virtual machine group 134.

Figure 4:
FIG. 4 illustrates a forwarding policy data structure to manage forwarding policies for virtual machines according to an implementation.

FIG. 4 illustrates a forwarding policy data structure 400 to manage forwarding policies for virtual machines according to an implementation. Forwarding policy data structure 400 is representative of policies that may be implemented in primary host site 110 and secondary host site 111 to manage communications of the software defined networks. Data structure 400 includes columns for policies 410, sources 412, destinations 414, services 416, and actions 418.

In operation, forwarding policies may be generated by an administrator of a computing environment to limit the interactions between virtual machines within the computing environment. In particular, each of the policies may define a source tag, a destination tag, a service, and an action that is applied when the source, destination, and service are identified. In the present example, the source tags and destination tags may be associated with one or more virtual machines to generate a group of virtual machines that are provided with similar forwarding policies.

In addition to generating the policy with the particular tags, the tags may be allocated to virtual machines in a computing environment. After a virtual machine is allocated a tag (often by an administrator of a software defined networking manager), the data plane for the virtual machine may be updated, such that communications to and from the virtual machine are inspected and forwarded based on the policy. Thus, if a virtual machine were associated with the source tag for policy A 440, then a communication from the virtual machine that is to a virtual machine with the requisite destination tag and using the protocol associated with policy A 440 will be forwarded according to the action associated with policy A 440.

Although each of the policies in FIG. 4 include a source tag and a destination tag, it should be understood that this is merely an example. In some implementations, at least one of the policies may have a source or destination that includes one or more IP addresses, uniform resource locators, or some other addressing format. For instance, at least one of the virtual machine groups in a computing environment may communicate with external end user devices. Additionally, in some implementations, in addition to source and destination tags, virtual machines may further be allocated one or more secondary tags. These secondary tags may be used to separate virtual machines between organizations or between divisions within an organization. For example, multiple organizations may desire to use policy A 440 as a template for their individual virtual machines and keep communications separate from other organizations using policy A 440.

Once a policy is defined in a first host site, the policy may then be communicated via a sync service to one or more additional host sites. This permits virtual machines at the additional host sites to implement the same forwarding policies with virtual machines executing thereon. These virtual machines may include back-up virtual machines of virtual machines operating at the first host site or may include virtual machines that are allocated policies similar to that of the first hosting site. In some implementations, the tags used in the first site may be mapped or associated with a tag that is used for the second site. Thus, the source tag for policy A 440 may be different than the source tag for policy A 440 implemented in the second site.

FIG. 5 illustrates a data structure 500 to manage object identifiers for multiple hosting sites. Data structure 500 is representative of a data structure that might be used by sync service 150 in mapping a virtual machine identifier in a first site to a virtual machine identifier in a secondary site. Data structure 500 includes columns for virtual machine identifiers from primary site 510 and secondary site 512.

As described herein, as a software defined networking configuration is received from a first host site, a sync service may be used to identify differences between the configuration and a previously received configuration. Once the differences are determined, the sync service may be required to map the differences identified in the configuration to identifiers for the secondary host site. This may include identifying corresponding virtual machines, and applying relevant tags to the virtual machines in the second hosting site. For example, if a new virtual machine with virtual machine identifier (VM ID) 520 is identified within primary site 510, the sync service may be used to identify the corresponding VM ID 530 for the virtual machine in secondary site 512. Once identified the appropriate tags may be associated with the virtual machine identifier and provided to the software defined networking manager of secondary site 512. For example, if a front-end tag were applied to a virtual machine associated with VM ID 520, then a front-end tag would similarly be applied to VM ID 530 in the configuration update provided to secondary site 512.

Although illustrated in the example of FIG. 5 as identifying virtual machine identifiers for software defined networking, it should be understood that similar operations may be used in identifying tags for corresponding virtual machines in some implementations. Moreover, while demonstrated as a single table in the present implementation, it should be understood that one or more arrays, linked lists, or some other data structure may be used to identify a virtual machine identifier in the second host site.

Figure 6:
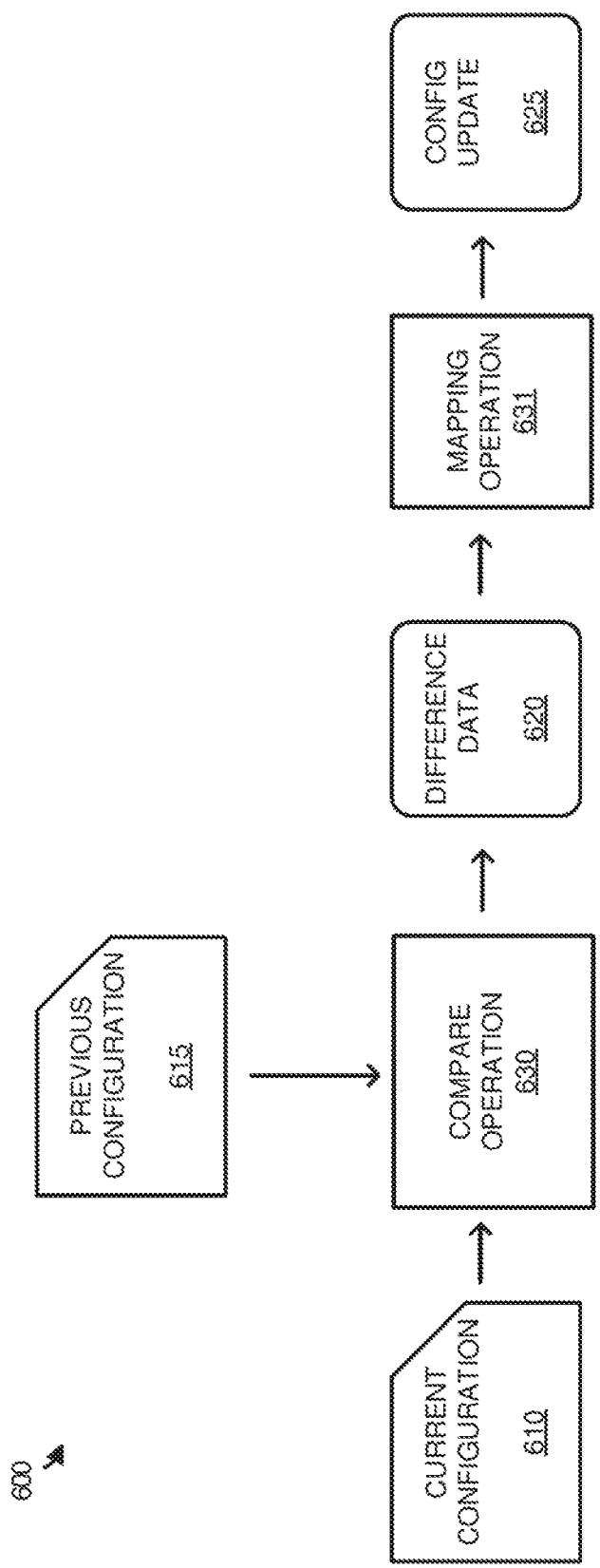
FIG. 6 illustrates an overview of generating a software defined networking configuration update for a secondary hosting site according to an implementation.

FIG. 6 illustrates an overview 600 of generating a software defined networking configuration update for a secondary hosting site according to an implementation. Overview 600 is an example operation of generating a configuration update by a sync service. Overview 600 includes current configuration 610, previous configuration 615, difference data 620, and configuration (config) update 625. Overview 600 further includes compare operation 630 and mapping operation 631.

In operation, a sync service may receive current configuration 610 from a software defined network manager in a first hosting site. In response to receiving configuration 610, compare operation 630 may be applied, wherein current configuration 610 is compared against a previous configuration 615 to determine difference data 620. In some implementations, the software defined networking configurations provided by the manager in the first hosting site at various intervals. These intervals may be periodic, may be based on requests from the sync service, or may be based on any other interval. The difference data may indicate any policies that have been added or removed, any tags that have been added and removed for virtual machines, any virtual machines that have been added or removed, or any other difference data between the configurations, including combinations thereof.

Once difference data 620 is determined, mapping operation 631 may be used to generate configuration update 625. In some implementations, mapping operation 631 may be responsible for modifying the difference data into a format that can be implemented by a software defined networking manager in a second hosting site. This may include identifying corresponding virtual machines in the second host site to virtual machines in the first host site, identifying any required corresponding tags for the virtual machines, identifying any modifications to the policies, or any other similar mapping between changes in the first host site and the second host site. Once configuration update 625 is determined, the configuration may be provided to the software defined networking manager of the secondary host site for implementation. This may include updating the data plane such that communications to and from the virtual machines in the secondary host site are processed in the same manner that communications in the first host site.

The various examples described above provide enhancements for managing software defined networking configurations over multiple hosting sites. In at least one implementation, organizations may employ one or more hosting sites to provide the required platform for their virtual machines. For example, an organization may employ a primary hosting site to host a plurality of virtual machines, and employ a secondary hosting site to provide a backup of the virtual machines. In particular, when a new virtual machine is deployed in the primary site, the virtual machine may be duplicated and prepared for operation on the secondary site. Consequently, if a failure were to occur at the first site, the backup virtual machines may be used to provide the operations required by the organization.

In deploying the virtual machines at each of the sites, software defined networks may be employed by each of the sites to ensure connectivity between virtual machines at the site and external computing systems and nodes. To provide the software defined networking functionality, a software defined networking manager or controller may be responsible for managing and deploying forwarding policies that provide actions to be taken against data packets as they are identified to and from virtual machines in a hosting site. These policies may each define a source for a communication, a destination for a communication, a service for a communication, and an action to be taken when the source, destination, and service are identified. For example, a policy may provide that a front-end virtual machine (source) may communicate with an application virtual machine (destination) using a particular service. Accordingly, when a communication is identified with the associated traits, the communication may be forwarded based on the policy.

In some implementations, such as the example provided above, the source and destination of a policy may be generated in the form of security groups or security tags. In particular, when an organization deploys multiple front-end virtual machines, the organization may prefer that each of the front-end virtual machines be provided with a similar networking configuration. Consequently, rather than providing a policy individually for each of the virtual machines, each of the virtual machines may be associated with a security group, such that communications over the software defined networks are handled in a similar manner. In some examples, the policies may be deployed within the host site by translating the policies into IP addresses, MAC addresses, and the like for the corresponding virtual machines, such that attributes of communications may be quickly identified in the communications and forwarded based on the policies.

Here, in addition to the software defined networking manager for the first host site, a sync service may be provided that is used to communicate software defined networking configuration updates to a second software defined networking manager at a second host site. In particular, the sync service may receive a software defined networking configuration from a manager at the first site, wherein the configuration may include policies and tags (defining virtual machine groups) for the virtual machines in the first site. Once received, the sync service may compare the configuration to a second configuration previously cached by the sync service. Once compared, and differencing data is determined between the configurations, an update may be generated for the secondary hosting site. In at least some implementations, objects, such as virtual machine identifiers or group identifiers/tags, for use with in the primary site may be required to be translated to secondary identifiers in the secondary site. For example, if a first virtual machine is added to a virtual machine group in the first environment, the sync service may identify a corresponding backup virtual machine identifier in the secondary site to allocate to a backup virtual machine group. Once the configurations updates are identified by identifying corresponding object identifiers, the configuration may be provided to a software defined networking manager at the secondary site for deployment.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a sync service to manage software defined networking configurations over multiple hosting sites, the method comprising:
   receiving a software defined networking configuration from a software defined networking manager of a first hosting site;
   determining differencing data between the software defined networking configuration and a second software defined networking configuration received previously by the sync service from the first hosting site;
   based on the differencing data, computing a configuration update for a second software defined networking manager of a second hosting site; and
   transferring the configuration update to the second software defined networking manager.

2. The method of claim 1, wherein the software defined networking configuration comprises software defined networking policies and security tags associated with each virtual machine of the first hosting site.

3. The method of claim 2, wherein each of the software defined networking policies comprise a source tag, a destination tag, a service, and an action.

4. The method of claim 1 further comprising transferring a request for the software defined networking configuration to the software defined networking manager of the first hosting site.

5. The method of claim 1 further comprising caching the software defined networking configuration.

6. The method of claim 1, further comprising:
receiving a third software defined network configuration from the software defined networking manager at the first hosting site;
determining second differencing data between the third software defined networking configuration and the software defined networking configuration;
based on the second differencing data, computing a second configuration update for the second software defined network manager of a second hosting site; and
transferring the second configuration update to the second software defined network manager.

7. The method of claim 1, wherein determining the differencing data between the software defined networking configuration and the second software defined networking configuration comprises identifying one or more virtual machines that have been added or removed based on the software defined networking configuration and the second software defined networking configuration.

8. The method of claim 1, wherein computing the configuration update for the second software defined networking manager of the second hosting site based on the differencing data comprises mapping virtual machine identifiers in the differencing data to virtual machine identifiers for second hosting site.

9. A computing apparatus comprising:
one or more non-transitory computer readable storage media;
a processing system operatively coupled to the one or more non-transitory computer readable storage media; and
program instructions stored on the one or more non-transitory computer readable storage media to manage software defined networking configurations over multiple sites that, when read and executed by the processing system, direct the processing system to at least:
receive a software defined networking configuration from a software defined networking manager of a first hosting site;
determine differencing data between the software defined networking configuration and a second software defined networking configuration received previously by the sync service from the first hosting site;
compute a configuration update for a second software defined networking manager of a second hosting site; and
transfer the configuration update to the second software defined networking manager.

10. The computing apparatus of claim 9, wherein the software defined networking configuration comprises software defined networking policies and security tags associated with each virtual machine of the first hosting site.

11. The computing apparatus of claim 10, wherein each of the software defined networking policies comprises a source tag, a destination tag, a service, and an action.

12. The computing apparatus of claim 9, wherein the program instructions further direct the processing system to transfer a request for the software defined networking configuration to the software defined networking manager of the first hosting site.

13. The computing apparatus of claim 9, wherein the program instructions further direct the processing system to cache the software defined networking configuration.

14. The computing apparatus of claim 9, wherein the program instructions further direct the processing system to:
receive a third software defined network configuration from the software defined networking manager at the first hosting site;
determine second differencing data between the third software defined networking configuration and the software defined networking configuration;
compute a second configuration update for the second software defined network manager of a second hosting site based on the second differencing data; and
transfer the second configuration update to the second software defined network manager.

15. The computing apparatus of claim 9, wherein the program instructions to determine the differencing data between the software defined networking configuration and the second software defined networking configuration direct the processing system to identify one or more virtual machines that have been added or removed based on the software defined networking configuration and the second software defined networking configuration.

16. The computing apparatus of claim 9, wherein the program instructions to compute the configuration update for the second software defined networking manager of the second hosting site based on the differencing data direct the processing system to map virtual machine identifiers in the differencing data to virtual machine identifiers for the second hosting site.

17. The computing apparatus of claim 9, wherein the program instructions further direct the processing system to:
compute a second configuration update for a third software defined networking manager of a third hosting site; and
transfer the second configuration update to the third software defined networking manager.

18. An apparatus comprising:
one or more non-transitory computer readable storage media; and
program instructions stored on the one or more non-transitory computer readable storage media to manage software defined networking configurations over multiple sites that, when read and executed by a processing system, direct the processing system to at least:
receive a software defined networking configuration from a software defined networking manager of a first hosting site;
determine differencing data between the software defined networking configuration and a second software defined networking configuration received previously by the sync service from the first hosting site;
compute a configuration update for a second software defined networking manager of a second hosting site; and
transfer the configuration update to the second software defined networking manager.

19. The apparatus of claim 18, wherein the software defined networking configuration comprises software defined networking policies and security tags associated with each virtual machine of the first hosting site.

20. The apparatus of claim 19, wherein each of the software defined networking policies comprises a source tag, a destination tag, a service, and an action.

* * * * *